United States Patent [19]

Lohr et al.

[11] Patent Number: 4,885,900
[45] Date of Patent: Dec. 12, 1989

[54] DRIVING METHOD AND SYSTEM FOR CONTROLLING A TUBULAR-BAG MACHINE

[75] Inventors: Herbert Lohr; Bernd Stein, both of Reiskirchen; Helmut Becker, Pohlheim; Reiner Ade, Bad Nauheim; Walter Baur, Gruendau, all of Fed. Rep. of Germany

[73] Assignee: Rovema Verpackungsmaschinen GmbH, Fernwald-Annerod, Fed. Rep. of Germany

[21] Appl. No.: 192,805

[22] Filed: May 11, 1988

[30] Foreign Application Priority Data

May 12, 1987 [DE] Fed. Rep. of Germany ....... 3715838

[51] Int. Cl.⁴ .................... B65B 9/08; B65B 51/30; B65B 51/14
[52] U.S. Cl. .................................. 53/551; 53/552
[58] Field of Search ............... 53/451, 551, 552, 550, 53/450, 373, 389

[56] References Cited

U.S. PATENT DOCUMENTS

| | | | |
|---|---|---|---|
| 3,583,126 | 6/1971 | McCollough | 53/551 X |
| 3,916,598 | 11/1975 | Adams et al. | 53/551 X |
| 4,128,985 | 12/1978 | Simmons | 53/551 X |
| 4,549,386 | 10/1985 | Wilson | 53/373 X |
| 4,727,707 | 3/1988 | Hadden | 53/451 |
| 4,750,313 | 6/1988 | Kammler et al. | 53/451 |
| 4,751,808 | 6/1988 | Hadden | 53/551 X |
| 4,757,668 | 7/1988 | Klinkel et al. | 53/551 X |

FOREIGN PATENT DOCUMENTS

| | | |
|---|---|---|
| 0071653 | 12/1985 | European Pat. Off. |
| 2852890 | 6/1980 | Fed. Rep. of Germany |
| 3621556 | 4/1987 | Fed. Rep. of Germany |

Primary Examiner—Horace M. Culver
Attorney, Agent, or Firm—Flynn, Thiel, Boutell & Tanis

[57] ABSTRACT

A driving method and system for controlling the operating characteristics of a tubular-bag machine, in which a tubular bag is closed off at the bottom end so as to be fillable with packing material through a fill pipe. An intermittently moved thin foil tube is for this purpose guided vertically between transversely arranged, heated sealing jaws, the opening and closing of which being camcontrolled. The foil movement is adjusted to the opening and closing movement. The drive for effecting the foil movement and the drive for effecting the sealing, separating and welding device are driven by separate motors controlled independently from one another, and are adjusted to one another such that each angular-speed stage can be adjusted independently from the preceding or following stage to the demands of the work cycle at any time during the work cycle. The magnitude of the angular speed can be adjusted as well.

9 Claims, 4 Drawing Sheets

DRIVING METHOD AND SYSTEM FOR CONTROLLING A TUBULAR-BAG MACHINE

FIELD OF THE INVENTION

The invention relates to a driving method and system for controlling a tubular-bag machine.

BACKGROUND OF THE INVENTION

Intermittently driven tubular-bag machines commonly operate in such a manner that a thin foil of a hot-sealable material is pulled off from a storage roller and the edges thereof guided together at a forming pipe to form a tube, after which the edges are welded together to form a longitudinal seam and the created tube is provided with sealing seams extending transversely with respect to the direction of transport. A tubular bag, which is closed at its bottom end, is supplied with packing material through the forming pipe and is then sealed at the top end (see U.S. Pat. No. 4,750,313.

In the common tubular-bag machines of this type, the drives of which operate with constant rotation frequencies, high dynamic stresses are created in view of the industrially requested performances, mainly stresses on the foil removing and cross-sealing devices. The proportionate times for the sealing task are during very short work cycles so short that the quality of the cross seams is lacking, for example, due to an insufficient heating up of the foil layers and insufficient cooling or solidification of the seam. Also the relatively early stress applied to the seam caused by the bag filling material can have negative effects. A tensile stress occurs on the filler pipe itself due to a frictional engagement of the lateral foil removing bands or belts, which tensile stress can result in an excessive stretching of the foil which results in an inferior package quality. In cases where only one single drive motor is used, the thus needed coupling-braking combination is subjected to a considerable amount of wear.

A main source of stress for the packaging machine is the common cam control structure for the sealing tools. Such high acceleration forces occur that the rollers can lift off from the control curves or cam surfaces in the area of extreme curvatures of the cam surfaces. It is also disadvantageous during adjusting and/or setting up of the machine for the angle adjustment of the control curves or cam surfaces to the filling and folding times of the packing material and to the foil removing times to have to be done very precisely, because such automatically requires much time.

An important goal of the invention is to improve the drive of the tubular-bag machines in a simple manner such that the sequences of movement are carried out as smoothly as possible and with little or no acceleration. Furthermore, the drive is to be flexibly controllable in order to substantially do justice to the practical operation demands and to achieve a high packing performance. It is further more desired to reduce the structural expense of the driving system.

Two separate, however, cooperating drives are provided according to the invention for effecting the movement of the foil on the one hand and of the sealing jaws on the other hand, which drives are in particular computer controlled. Due to these measures a great quietness and high degree of flexibility of the drive is achieved. Optimum sequences of movement with very little expense can be achieved for many different uses. Performance ranges are thereby achieved also for intermittent tubular-bag machines, in which up to now a continuous operation was necessary. The stress limits are now not only determined by the machine elements, but by the characteristics of the diverse packing materials.

This is substantially helped if, according to one measure of the invention, the angular speed of the control curves or cam surfaces for the sealing jaws is variable. Thus it is possible for at least two angular-speed stages to occur within each work cycle, which pass preferably smoothly over into one another and can have an extreme relationship of up to 1:5. From this do not only result great advantages for the method, but also for the equipment and inventory of parts, since one is now able to work with uniform control cams of few basic forms and sizes.

Two similar control cams sit in a preferred embodiment offset at 180° to one another on a drive shaft, the speed of which is variable during each rotation. A special design of the control cam is particularly advantageous both for minimizing the dynamic stresses and also for creating optimum sealing seams, because the angular speed is always the lowest in the sealing phase, even though the associated curved sector can be limited to a relatively small center angle of, for example, approximately 60°. This allows for very favorable kinematic transitions to other radii or stroke positions, which extend over large angle ranges.

The method and device of the invention are constructed such that optimum long durations and cooling times are available whereat a cross-sealing device is provided. Furthermore, the foil transport is limited to a portion of the work cycle, so that not only a protective removal of the foil material is assured, but simultaneously also the packaging and foil removal is substantially increased. With this a much more flexible operation of intermittent tubular-bag machines is achieved in comparison to the state of the art, which machines are thus considerably more versatile and more efficient than common machines.

BRIEF DESCRIPTION OF THE DRAWINGS

Further characteristics, details and advantages of the invention will be understood by those of ordinary skill in the art by reading the following description with reference to the exemplary embodiments in the drawings, in which.

DETAILED DESCRIPTION

Figure 1:
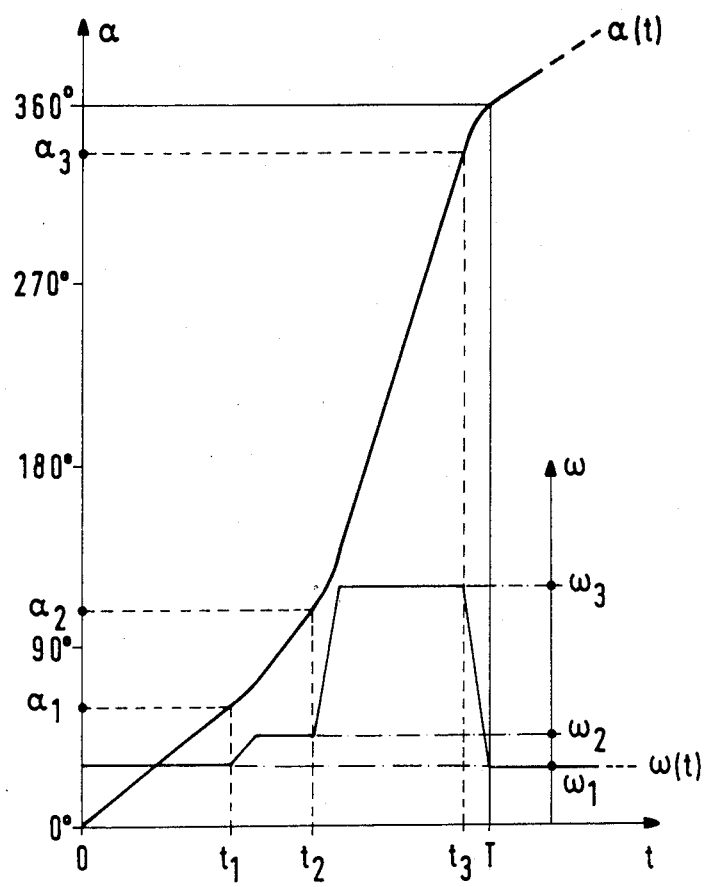
FIG. 1 is a typical time diagram of the angle of rotation and of the angular speed in a work cycle of the inventive method.

The start of the sealing or of the welding time is chosen as the time 0 for the curves illustrated in FIG. 1. The control drive (FIGS. 2 and 3) runs hereby at a substantially constant, low angular speed $\omega_1$ up to a sectorial angle $\alpha_1$ of, for example, 60°. The time $t_1$ is available for this, which takes up a relatively large part of the entire work cycle T. A relative flat transition to a second angular speed $\omega_2$ occurs, which is maintained until a further angle of rotation $\alpha_2$ of approximately 110° is reached; at this time $t_2$, already more than half of the work cycle T, has passed. A smooth, but steep increase of the angular speed occurs now up to a stage $\omega_3$, which is substantially maintained until a time $t_3$, thus until an angle $\alpha_3$ shortly before the end of the full rotation is reached. The angular speed then returns to the lowermost stage $\omega_1$, and the next work cycle can start.

Figure 2:
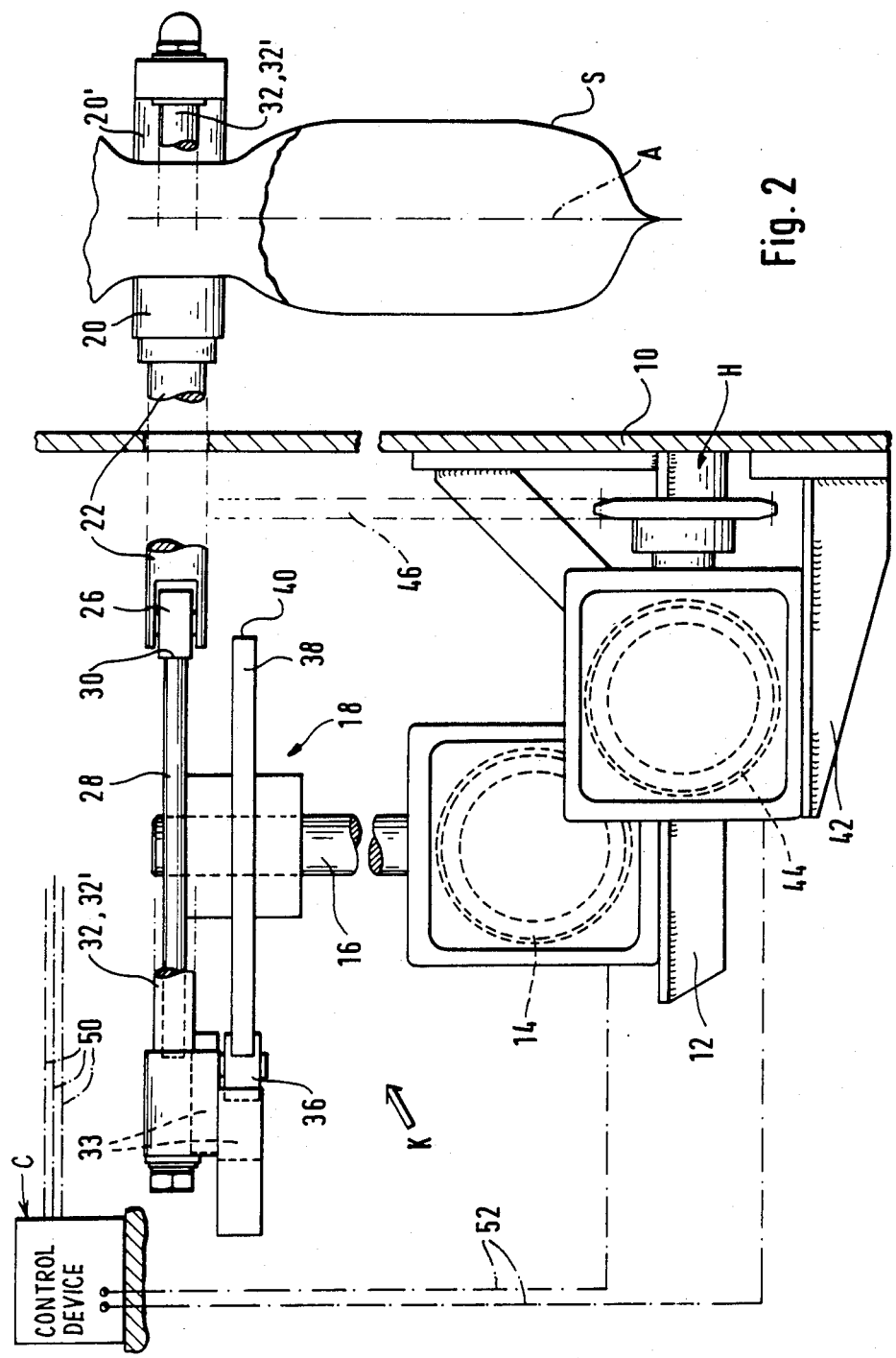
FIG. 2 is a partial schematized side view of a driving and sealing device.
Figure 3:
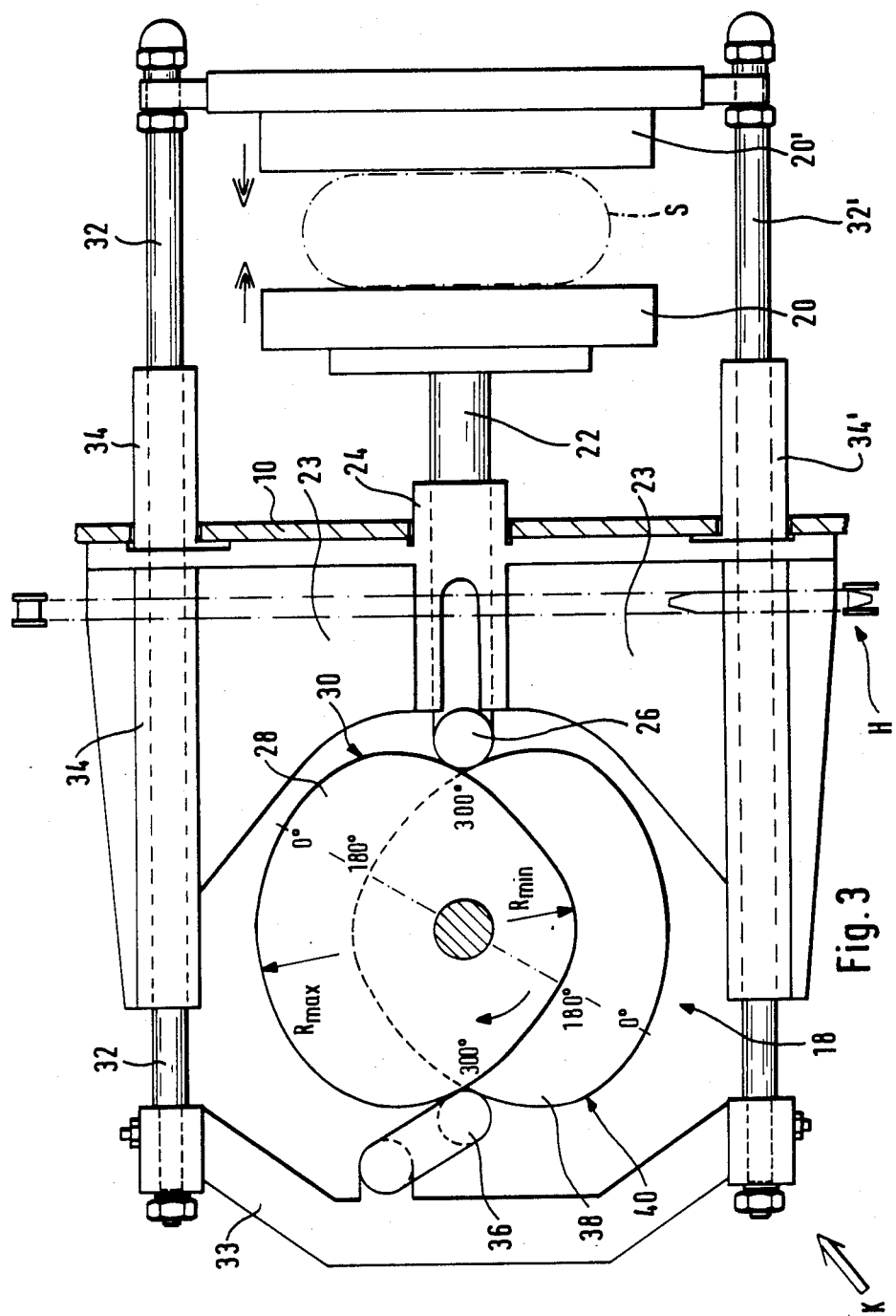
FIG. 3 is a top view of important parts of the arrangement of FIG. 2.

The structure reqiured to carry out such work cycles are illustrated in FIGS. 2 and 3. A bracket 12 is secured to a front plate 10 of a tubular-bag machine, which bracket holds a servodrive 14 having a drive shaft 16. Same carries a curve or cam package 18 to control two sealing jaws 20, 20' through a push rod 22 and/or a pushrod pair 32, 32'. The push rods 22/32/32' are movably supported in a guideway 23 having sleeves 24/34/34' thereon. A curve or cam following roller 26 carried on the front side by the push rod 22 engages or scans an upper control cam 28 of the curve or cam package 18 on the outer contour 30. The contour 40 of a lower control cam 38 is engaged or scanned by a curve or cam following roller 36, which is held on a bar 33 between the push-rod pair 32, 32'. The aforedescribed arrangement forms as a whole a sealing-jaw drive K.

Furthermore, the front plate 10 holds on a bracket 42 a further servodrive 44 for the foil drive H of a drive chain 46 which is only schematically indicated.

A control device C constructed as a computer is fed with data through input lines 50 and is connected to the drives 14, 44 through output control lines 52.

The sealing jaws 20, 20' can be moved in and out by a movement of the push rods 22; 32, 32' transversely to the vertical front plate 10. While the foil drive H guides in a pregiven work cycle tubular material to the sealing jaws 20, 20' as well as in between the sealing jaws when the jaws are open or separated from one another. The peripheral point on the control cams 28, 38, identified by the 0° reference in FIG. 3, corresponds with the start of the closing of the sealing jaws 20, 20'. A seam is created in this manner, which closes the preceding tubular bag S and simultaneously forms a bottom seam on the next following tubular bag (like before—at the bottom in FIG. 2). The fill material is poured into the tubular bag S, which is open at the top end, with the sealing jaws 20, 20' closed until the time $t_1$ and possibly slightly beyond this time. In order to achieve an optimum solidification of the created sealing seam, the sealing jaws 20, 20° are opened slightly until the time $t_2$, thus until the curve angle $\alpha_2$, so that outside air can be added for cooling. The complete opening and closing of the sealing jaws 20, 20' occurs at the angular-speed stage $\omega_3$ during the second half of the work cycle T, with the tubular bag S dropping down pursuant to a common separating operation using a cutting knife integrated into one sealing jaw, as a finished package, and the next tube section is supplied by the foil drive H. As is disclosed in FIG. 5, the drive H is hereby started and stopped, in each case with smooth transitions, for example, with a sinusoidal acceleration and deceleration characteristic.

The return time needed until the time $t_3$ depends in the first place on the intended size of the package and determines very significantly the output performance of the packaging machine. One recognizes that the return area is covered very quickly according to the invention, with the dynamic stresses on the tubular-bag machine remaining very low due to the long transitions provided by the control cams 28, 38 (compare FIGS. 3 and 4). The smooth contours 30, 40 of the curve or cam package 18 offer the additional advantage that the positioning of the control cams 28, 38 on the drive shaft 16 allows for a certain degree of tolerance freedom. The necessary adjusting operations are thus made considerably easier and are significantly accelerated.

Figure 4:
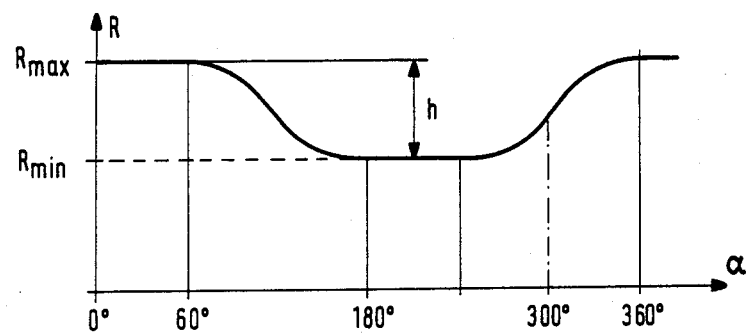
FIG. 4 is a developmental diagram showing the dependency of the angle on the radius/stroke of a control cam.
Figure 5:
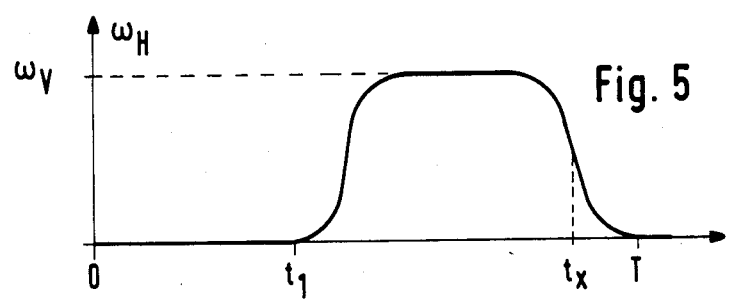
FIG. 5 is a time diagram of the angular speed of a foil drive during a work cycle.
Figure 6:
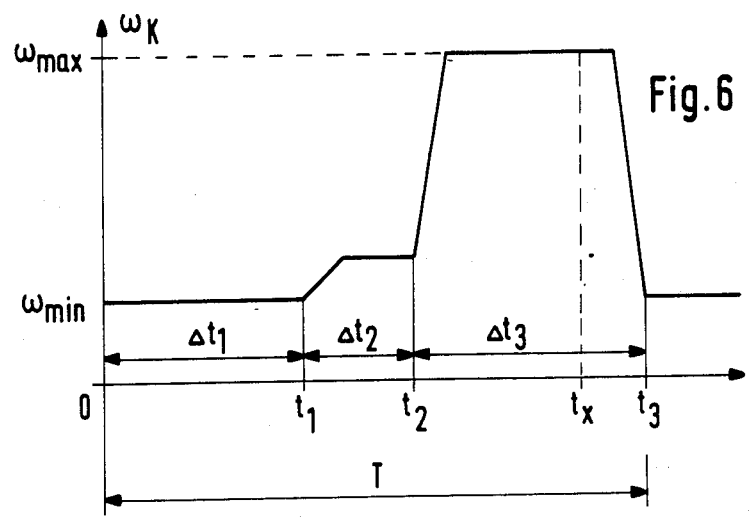
FIG. 6 is a time diagram of the control cam angular speed during a work cycle.

FIGS. 2 and 3 show the state in which the curve or cam following rollers 26, 36 engage or scan approximately the 300°-peripheral point of the control cam curves 28, 38. A filled, not closed tubular bag S is held for a suitable time ($t_x$ in FIGS. 5 and 6) along the package axis A (FIG. 2) with its upper part still between the sealing jaws 20, 20'. The foil removing belts (not illustrated) are at the same time smoothly decelerated in sinusoidal characteristic in order to terminate the foil transport prior to the start of the next work cycle T (FIG. 5). The control cams already carry out the working stroke between the smallest radius $R_{min}$ and the largest radius $R_{max}$ (FIG. 4). It is important for the inventive method that the angular speed of the curve or cam package 18 be changeable during each rotation to adapt to the cycle of the foil transport. Thus the angle area from 0° to 360° is passed through nonlinearly, as can particularly be recognized in FIG. 1.

The invention is not limited to the illustrated numbers and shapes of the angle sectors. The illustrated curves are suitable for the most common flat or cushion form of tubular bags. However, it is also possible and it is inventively intended to define additional angle sectors and/or angular-speed stages in order to facilitate other packaging sequences and designs. Thus the time period $\Delta t_1$, thus the duration during the sealing task, can be extended if simultaneously, for example, a side-folding device is provided for creating block-bottomed or squared off bags capable of standing upright. Also it is possible to interposition a phase for the bag forming task during and/or after the time period $\Delta t_2$ and prior to the time period $\Delta t_3$ or to extend $\Delta t_2$, if necessary, in order to, for example, bring about a rectangular design of the bag, which facilitates a direct vertical filling into a packaging box.

The comparatively long time $\Delta t_1$ is particularly advantageous when using permanently heated sealing jaws 20, 20' for thermoplastic plastic foil. The data to be fed into the control device C depend among others from the type and amount of the packaging material or goods to be packaged, from which the optimal durations in the individual angle sectors can be computed and, if necessary, can be changed. The transport time for the respective foil sections are chosen as long as possible in order to substantially reduce the stress on the material. The earliest start and the latest termination of the foil transport is advantageously chosen such that they occur when the cam-controlled position of the sealing tools 20, 20' permits the further transport of the package (with a low stress on the foil).

An important advantage of the invention is based on the drives H, K permitting relatively short setting-up times with an extremely precise and reproducible positioning. Moreover, the inventive control cams 28, 38 can be easily made common in form and relatively simple in shape with respect to a plurality of the many various parameters of application.

All characteristics and advantages disclosed in the claims, the description and the drawings, including structural details, spacial arrangements and method steps, can be inventively significant both by themselves and also in many different combinations.

The embodiments of the invention in which an exclusive property or privilege is claimed are defined as follows:

1. In a drive system for controlling the operation of a form/fill/seal machine, including a computer control device for producing control signals, means for intermittently advancing a thin foil, forming it into a tube shape and guiding it vertically between heated sealing jaws that act transversely to the direction of movement of said foil, whereby a tubular bag closed at its bottom is formed and is adapted to be filled with a packing material through a fill pipe, said sealing jaws being equipped with motive means including push rods connected to two separate but cooperating drive means controlled by said computer control device for effecting the movement of the foil on the one hand and the sealing jaws on the other hand, the improvement wherein said motive means includes at least two cam follower rollers connected to and movable with said push rods, and wherein controlling means are provided for independently controlling each of said drive means such that its angular speed is, at any time during a work cycle, independent from a preceding or following angular speed stage, said controlling means comprising a cam package with at least two contoured control cams coupled to a common drive shaft, said at least two control cams being contour-engaged by said cam following rollers for effecting an opening and closing of the sealing jaws in directions opposite to each other.

2. The system according to claim 1, wherein said at least two contoured control cams include cam surface means adapted to provide, between stages of lowest and highest angular speed, at least one stage with a different angular speed and wherein the angular-speed stages follow one another smoothly.

3. The system according to claim 2, wherein said cam surface means further includes contours for facilitating a stage of constantly low angular speed followed by a shorter stage with a slightly higher angular speed which is followed by a longer stage with a high angular speed.

4. The system according to claim 1, wherein said computer-controlled drive means includes variable speed motor means, and wherein said at least two contoured control cams include two similarly shaped control cams arranged offset by 180 to one another on said common drive shaft whose speed is adapted to be varied by said motor means during each rotation.

5. The system according to claim 1, wherein each control cam is approximately heart-shaped and includes a flattened peripheral part with a large radius ($\leqq R_{max}$) followed by a peripheral part with a smaller radius ($\geqq R_{min}$).

6. The system according to claim 1, wherein said control cams have such contours that the sealing jaws are stopped at least twice during each work cycle.

7. The system according to claim 1 wherein a first standstill position of the sealing jaws is determined by a cam sector of 60°.

8. The system according to claim 7, wherein the contour of said control cams facilitate the sealing jaws opposing one another, in a second standstill position, with a large air separation therebetween.

9. The system according to claim 2, wherein said controlling means further facilitates the contour of said control cam and said means for intermittently advancing said foil to be timely related to cause said foil to standstill during the stage of lowest angular speed.

* * * * *